No. 731,897. PATENTED JUNE 23, 1903.
G. HAUENSTEIN.
RAKE ATTACHMENT FOR REAPERS OR MOWERS.
APPLICATION FILED DEC. 9, 1902.
NO MODEL.

WITNESSES: INVENTOR
Godfried Hauenstein
BY
ATTORNEY

No. 731,897. Patented June 23, 1903.

UNITED STATES PATENT OFFICE.

GODFRIED HAUENSTEIN, OF OLDS, IOWA.

RAKE ATTACHMENT FOR REAPERS OR MOWERS.

SPECIFICATION forming part of Letters Patent No. 731,897, dated June 23, 1903.

Application filed December 9, 1902. Serial No. 134,532. (No model.)

*To all whom it may concern:*

Be it known that I, GODFRIED HAUENSTEIN, a citizen of the United States, and a resident of Olds, in the county of Henry and State of Iowa, have invented a new and Improved Rake Attachment for Reapers or Mowers, of which the following is a full, clear, and exact description.

The purpose of the invention is to provide a rake as a substitute for a reel upon a reaper or mower, whereby the grain will be drawn to the cutter-bar and over the platform at the rear thereof no matter whether the grain is standing upright or is inclined more or less in direction of the ground, and, further, to provide means for supporting a rake so that it will have a rotary reciprocating motion over the grain-receiving platform and over and in advance of the cutter-bar.

Another purpose of the invention is to so support and locate the rake that it may be driven by the same gearing usually employed to impart motion to the reel.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in both the figures.

Figure 1:
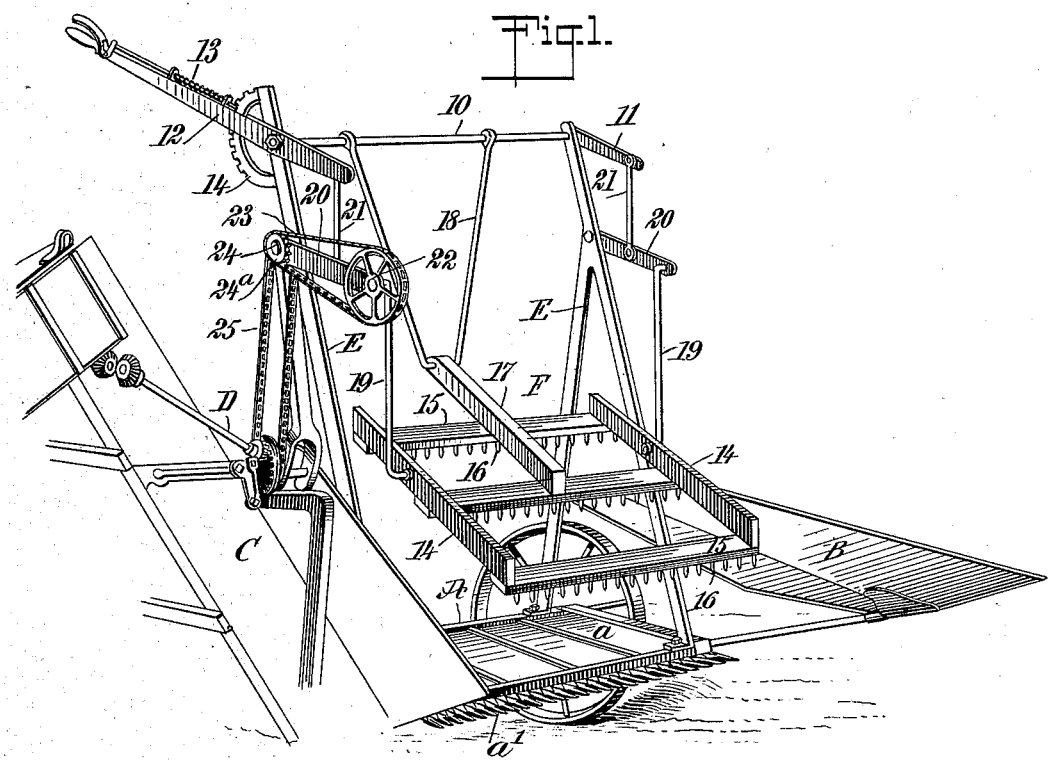
Figure 2:
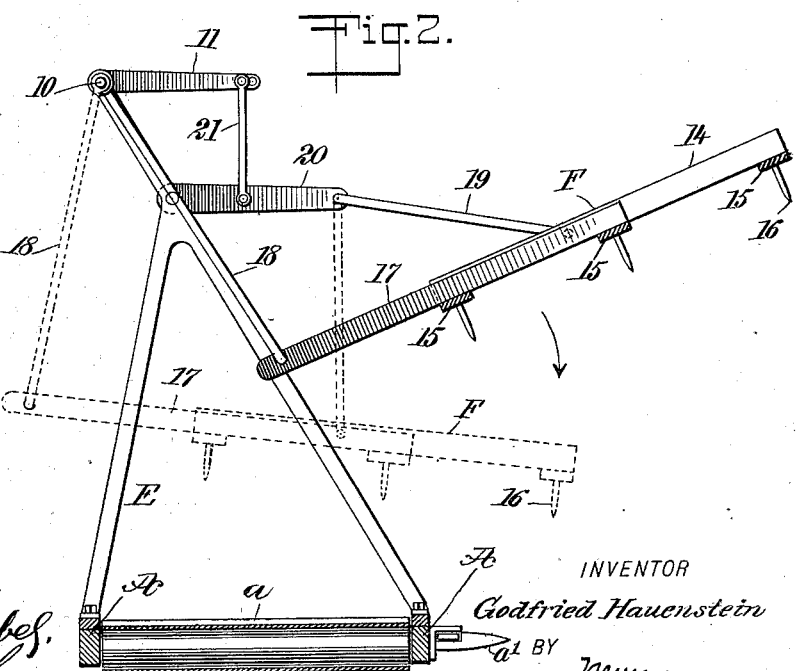

Figure 1 is a perspective view of the platform-section of a mowing-machine and the improved rake, illustrating the application of the rake to the mower; and Fig. 2 is a vertical section through the rake and its support and a transverse section through the grain-platform of the mower.

A represents the grain-platform of a mowing-machine, provided with a conveyer $a$ and the usual cutter-bar $a'$.

B represents the divider, C the grain-elevator, and D the usual driving mechanism employed in mowing-machines to impart motion to the reel.

Standards E are secured upon the grain-platform A at each end, and the lower portions of these standards are preferably bifurcated, so that a leg of each may rest upon the front and rear portions of the frame of the grain-platform. At the upper ends of the said standards a shaft 10 is journaled, and at the left-hand end of the said shaft a forwardly-extending crank-arm 11 is secured, while at the opposite end of the said shaft 10 a hand-lever 12 is attached, the attachment being between the forward end of the lever and its center and so made that the forward portion of the lever will extend beyond the shaft 10 a corresponding distance to the crank-arm 11. The hand-lever 12 is provided with the usual thumb-latch 13 for engagement with a rack 14, whereby to hold the said lever in adjusted position.

The rake F is adapted to have rotary reciprocating movement over the grain-table and to extend in its upward movement beyond the vertical plane of the cutter-bar, so that in the downward and rearward movement of the rake it will effectually draw any grain that may be in its path toward and over the grain-table, and the rake in its downward and rearward movement, particularly at its forward end, approaches the table close enough to pick up any grain that may have been blown or trampled down, thus insuring all of the grain being evenly cut. The said rake consists of side pieces 14 and cross-bars 15, provided with downwardly-extending teeth of any approved type, and a central or intermediate longitudinal bar 17, which projects a desired distance beyond the rear of the frame of the rake. This rearwardly-extending intermediate bar or beam 17 is pivotally connected with the shaft 10 by a substantially V-shaped hanger 18. Crank-arms 19 are pivotally attached to the side pieces 14 of the said rake-frame, preferably at a point between their centers and their rear ends, and these crank-arms 19 consist of vertical central or main members and terminal members extending in opposite directions at right angles from the body members. The lower members of the crank-arms 19 are pivotally connected with the said rake, while the upper members are pivotally attached to arms 20, pivoted to the standards E, one below the crank-arm 11 of the shaft 10 and the other below the forwardly-extending portion of the hand-lever 12. The upper terminal member of the right-hand crank-arm 19 extends through and beyond the right-hand pivoted arm 20 a sufficient distance to have a pulley 22 secured thereto.

The rake F is lifted or raised whenever desired and is held in its adjusted elevated or lowered position by the hand-lever 12 in connection with the thumb-latch 13 and rack 14, the forward end portion of the said hand-lever being connected with the right-hand pivoted arm 20 by a link 21, while the crank-arm 11 at the left-hand end of the shaft 10 is connected by a similar link with the left-hand pivoted arm 20. A rotary reciprocating movement is imparted to the rake by means of a belt 23, passed over the pulley 22 and over a similar pulley $24^a$, secured upon a shaft 24, which also serves to pivot the right-hand arm 20 to the right-hand standard E, and this shaft 24 is driven by a pulley, (not shown,) also secured on the shaft 24 at the back of the pulley $24^a$. The driving-chain 25, connected with the driving mechanism D, heretofore referred to, is made to pass over the second or inner pulley on the said shaft 24.

This device is exceedingly simple and durable and is economic in its construction. It is especially adapted to replace a reel, as has been stated, and will act to pick up and carry the grain to the cutter-bar and grain-table where a reel would not act.

It is evident that the rake F may be applied to any type of reaper or mower, it being simply necessary to remove the reel and replace it by the rake and its accompanying supports, which are few and simple.

I desire it to be understood that if in practice it is found desirable the crank-arms 19 may be made continuous or formed from one piece of material.

Having thus described my invention, I claim as new and desire to secure by Letters Patent—

1. In reapers and mowers, the combination with the grain-platform and standards secured to the grain-platform, of a rake suspended between the said standards over the said grain-platform, arms extending forwardly from the said standards to form supports for the rake, a shaft connecting the said standards at their top, a hanger for the rear of the rake, pivotally attached to the rake-frame and to the said upper shaft connecting the standards, crank-arms pivotally connected with the arms and with the said rake, a driving-pulley secured to one of the said crank-arms, and means for driving the said pulley from the driving mechanism of the reaper and mower to which the application is made, as set forth.

2. In reapers and mowers, the combination with the grain-platform and its cutter-bar, standards extending upward from the said grain-platform, a shaft journaled at the upper end of the said standards, a crank-arm at one end of the said shaft, a lever secured to the opposite end of the shaft, and a locking device for the lever, of arms pivoted to the said standards and extending forwardly therefrom, link connections between the said forwardly-extending arms and the crank-arm of the upper shaft and the forward portion of said lever, a rake mounted for movement between the standards, a hanger-support for the rear portion of the rake, pivotally connected with the said rake and with the said upper shaft, crank-arms located at each side of the said rake, each crank-arm consisting of a central vertical body member and terminal members extending in opposite directions at right angles to the body member, the lower terminal members of the crank-arms being pivotally attached to said rake and the upper terminal members pivotally connected with the forwardly-extending arms, and a driving-pulley attached to the upper terminal member of one of the said supporting crank-arms for the rake, as set forth.

3. In reapers and mowers, the combination with the grain-platform, and standards secured thereto, of a rake suspended between the said standards over the said grain-platform, pivoted arms extending forwardly from the said standards, a shaft connecting the said standards at their top, a hanger for the rake pivotally attached to the rear portion of the rake-frame and to the said upper shaft connecting the standards, crank-arms pivotally connecting the sides of the rake-frame with the forward ends of said pivoted arms, means carried at each end of said top shaft and connected with said forwardly-extending arms for elevating the forward ends of said arms, whereby to elevate the rake, a driving-pulley secured to one of said crank-arms, and means for driving the said pulley from the driving mechanism of the reaper and mower to which the application is made, as set forth.

In testimony whereof I have signed my name to this specification in the presence of two subscribing witnesses.

GODFRIED HAUENSTEIN.

Witnesses:
ISAAC PHILLIPS,
CHARLIE ADAMS.